United States Patent [19]

Pepin et al.

[11] 4,380,028
[45] Apr. 12, 1983

[54] TELEVISION CAMERA EQUIPPED WITH AN ANTI-BLOOMING DEVICE

[75] Inventors: Christian Pepin; Jean P. Trahand, both of Paris, France

[73] Assignee: Thomson-CSF, Paris, France

[21] Appl. No.: 233,120

[22] Filed: Feb. 10, 1981

[30] Foreign Application Priority Data

Feb. 12, 1980 [FR] France .................. 80 03048

[51] Int. Cl.³ ............................................. H04N 5/34
[52] U.S. Cl. .................................................. 358/219
[58] Field of Search ............... 358/160, 163, 209, 217, 358/219; 315/383, 386

[56] References Cited

U.S. PATENT DOCUMENTS 4,190,865 2/1980 Bendell ............................... 358/219
4,259,691 3/1981 Monahan et al. ................. 358/219

FOREIGN PATENT DOCUMENTS 2824323 7/1978 Fed. Rep. of Germany .
2385278 10/1978 France .
2402985 4/1979 France .

OTHER PUBLICATIONS

L'onde Electrique, vol. 52, No. 8, pp. 367-370, Sep. 1972.

Primary Examiner—Robert L. Richardson
Attorney, Agent, or Firm—Cushman, Darby & Cushman

[57] ABSTRACT

A television camera equipped with a device making it possible to automatically eliminate the blooming effect produced by a saturating bright spot.

The device includes a closed loop formed by a circuit for the comparison of the video signal with a predetermined threshold close to the saturating level and whose output supplies a generator for deflection signals corresponding to the localization at X and Y of the bright spot on the image and a generator for producing a unblanking signal for the tube during the line flyback and with a frequency variable as a function of the brightness of the bright spot, and circuits for mixing the deflection and unblanking signals respectively with TV scan deflection signals and with the beam blanking signal in such a way that there is a local modification of the tube sensitivity at the location of the bright spot by reducing the charge integration time.

6 Claims, 5 Drawing Figures

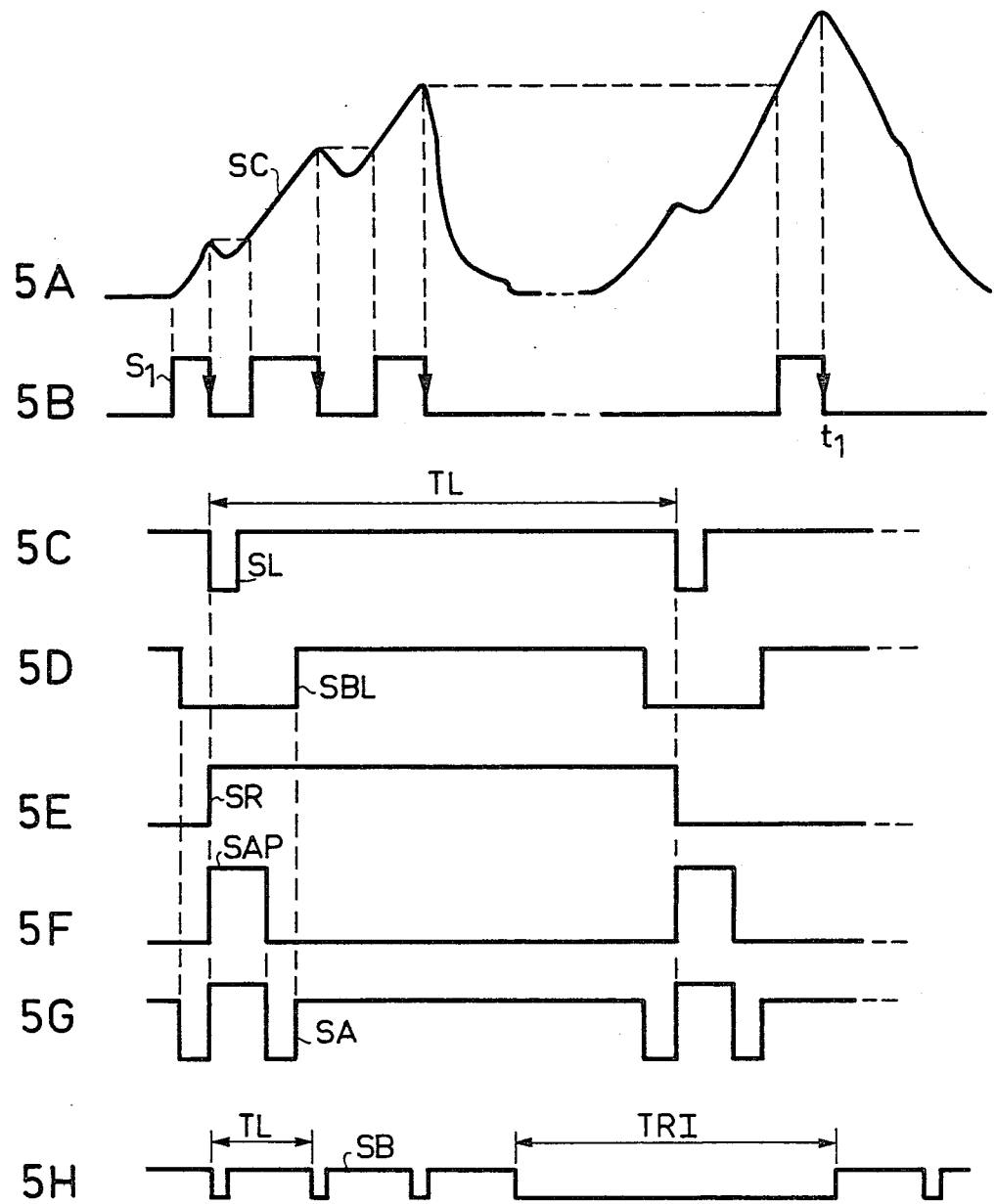

TELEVISION CAMERA EQUIPPED WITH AN ANTI-BLOOMING DEVICE

BACKGROUND OF THE INVENTION

The invention relates to improvements to television cameras and more specifically to an anti-blooming device for equipping such a camera. The invention more specifically applies in an advantageous manner to systems for the guidance of missiles by television.

The device is intended to prevent the effect of blooming produced at the camera tube of a television camera by a very bright object present in the observed scene. The sensitivity of the tube, such as a vidicon, is a function of the nature of the photosensitive layer (quantum efficiency, spectral band) and the charge storage time. When a very bright spot focused on the tube produces illumination exceeding the saturation limit of the photoreceiving target, the image obtained on a TV monitor associated with the camera is widened in the form of a stain, whose size increases with the brightness of the bright spot compared with the saturation illumination of the camera tube. This effect is called blooming.

This phenomenon can be very prejudicial to operation, because the thus formed stain can mask parts of the image which are particularly important for the envisaged mission. This is particularly the case with missile guidance systems by television when the bright spot constituted by the missile masks the tracked target (to prevent any confusion the photosensitive target of the tube will be called retina hereinafter). The bright spot is constituted by gases emitted by the rocket propulsion system, which may also have a tracer device constituted by a complementary pyrotechnic charge. Television guidance of the missile can, for example, take place in the following way. The television camera supplies an image of the scene which is visually utilized by the operator, who maintains the sighting axis (centre of the TV image) pointed on the target tracked from the image present on the monitor. As an automatic tracking system is also associated with the missile, it is clear that the widened image of the missile will mask the target when located in the vicinity of the sighting line.

BRIEF SUMMARY OF THE INVENTION

The problem of the present invention is to prevent this blooming effect and the various disadvantages which may result therefrom, in such a way as to preserve a useable image of the observed scene.

The anti-blooming device according to the invention achieves this objective by locally modifying the sensitivity of the camera tube by reducing the integration time.

According to a feature of the invention this function is obtained by a loop circuit used for the detection of the saturated area compared with the video signal detected at a predetermined threshold close to the tube saturation level and then, on the basis of the comparison result, the production of deflection signals for locating the beam substantially on the bright spot and a signal applied during the flyback intervals with a frequency which is a function of the brightness of the bright spot.

BRIEF DESCRIPTION OF THE DRAWINGS

The invention is described in greater detail hereinafter relative to non-limitative embodiments and the attached drawings, wherein show:

FIG. 5: wave shapes relative to the operation of the means according to FIG. 4.

DETAILED DESCRIPTION OF THE PREFERRED EMBODIMENTS

Figure 1:
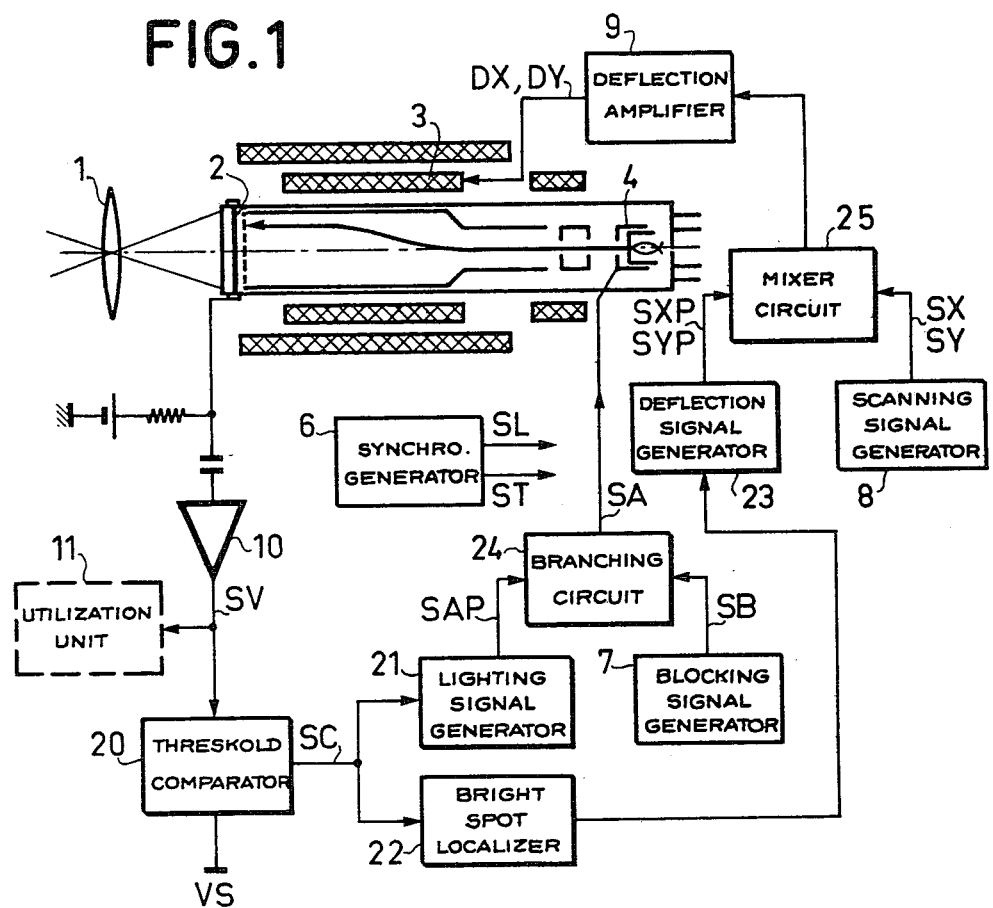
FIG. 1: a general diagram of a television camera equipped with an anti-blooming device according to the invention.

According to the general diagram of FIG. 1 the camera comprises a camera tube making it possible to translate brightness data into video signals SV, as well as conventional scanning and synchronizing circuits associated therewith. The tube, of the charge storage type, such as e.g. a vidicon is represented by its essential components. It is possible to see the focusing optics 1, a photoconductive layer 2 forming the retina, the deflection members 3 (coils in the case of an electromagnetic deflection and plates in the case of an electrostatic deflection), the modulation grid or modulator 4, together with the cathode, accelerating grid, a wall electrode, the field grid and alignment and focusing coils not given reference numerals in the drawing.

The associated circuits are represented by a circuit 6 generating line synchronizing signals SL and frame synchronizing signals ST, a circuit 7 for generating the blanking signal which blanks out the beam during the line and frame intervals and a generator circuit 8 for the line scanning (horizontal scanning at X) and frame or image scanning (vertical scanning at Y). The signals SX and SY are applied to the deflection members 3 after power amplification at 9 so as to constitute the deflection voltages DX and DY.

The tube serves a photodetection function by transforming the light into electrical charges, a charge storage function ensured by the retina and a signal reading function by the electron gun which analyses the charges stored between two successive scanning operations. The integration time of the charges at each point is equal to the period TI of the vertical frame scan. The output signal is preamplified in a circuit 10 to constitute the video signal SV transmitted to an ancillary utilization device 11, e.g. a television monitor.

According to the invention the anti-blooming device comprises a loop circuit energized by the video SV and which is closed by the camera tube. The circuit is broken down in simplified manner into a threshold comparator circuit 20, whose output supplies a circuit 21 for generating a signal SAP for unblanking the beam during the flyback intervals and a circuit 22 for the localization at XY of the bright spot on the retina, followed by a circuit 23 generating deflection signals SXP, SYP corresponding to said spot. Moreover, mixer or branch circuits 24 and 25 are provided for transmitting the conventional blanking signals SB and scanning signals SX, SY and for applying, during the flyback, the signals SAP and deflection signals SXP, SYP relating to the elimination of the detected bright spot.

Figure 2:
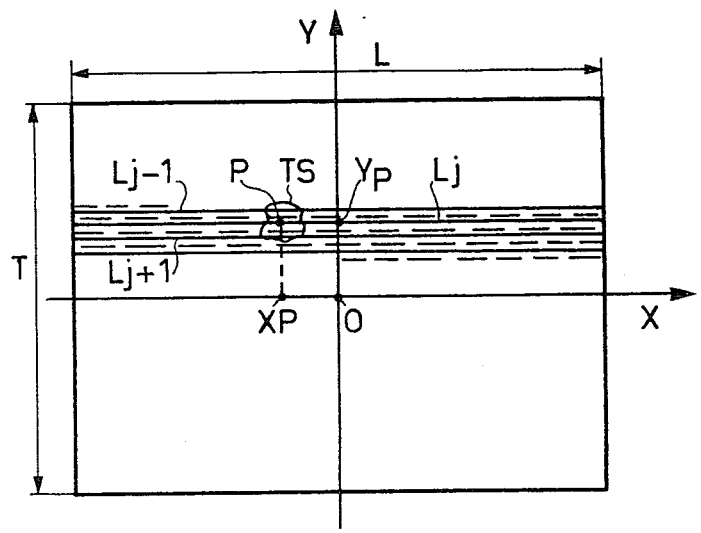
FIG. 2: the line-by-line scanning of the photosensitive retina and the blooming phenomenon by a bright spot.

FIG. 2 represents the line-by-line scanning of the retina and in particular a bright spot P which has given rise to a stain TS covering several lines at Y, Lj−1, Lj and Lj+1. XP and YP are coordinates of the bright spot and L and T dimensions of the scanned image. The zero coordinate point 0 is considered to be in the centre of the image.

Figure 3:
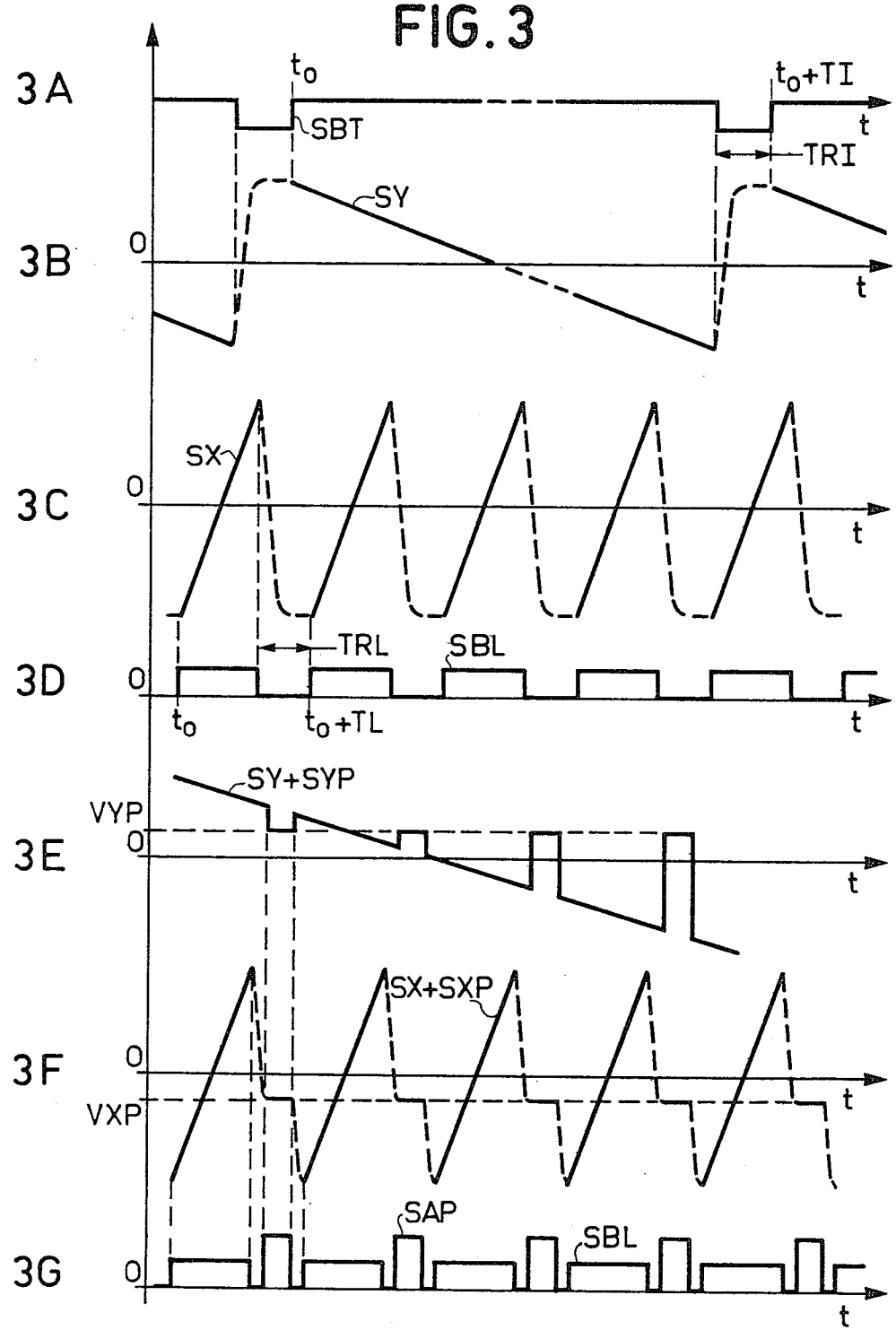
FIG. 3: wave shapes illustrating the process used according to the invention.

The process used is demonstrated by means of the wave shapes of FIG. 3. In normal operation, i.e. when there is no bright spot, the scanning signals have the conventional shape indicated at 3B for frame scanning and 3C for line scanning. FIG. 3A corresponds to the frame blocking signal SBT and FIG. 3C to the line blocking signal SBL. The output SB of generator 7 is constituted by the mixture of two blocking signals SBL and SBT (see FIG. 5H). The process consists of locally modifying the sensitivity of the tube at the location of the bright spot, or substantially by modifying the scanning of the tube so as to erase the charges stored at this point and to bring them to a value compatible with satisfactory operation. To this end use is made of the time left free by the line flyback interval TRL and frame flyback interval TRI for scanning the spot P in question and controlling the charge at this point by the effect of the circuit. The bright spot is thus scanned at a frequency higher than that used for analysing the remainder of the image. This frequency is controlled by the circuit as a function of the evolution of the phonomenon, i.e. the brightness of the bright spot. For example with an analysis standard of 625 lines 50 Hertz CCIR the frame period is 20 ms. By scanning the same spot on each line return (case shown in FIG. 3E to 3G) the integration time at this spot is reduced to 1 line period, i.e. 64 μs and the sensitivity is locally reduced in the ratio 312. In general terms on scanning this spot one line out of n the local sensitivity reduction level is 312/n. FIGS. 3E and 3F show the modifications of the scanning signals at Y and X respectively, the deflection levels VYP and VXP being a function of the coordinates of the bright spot P. FIG. 3G shows the line blanking signal SBL of FIG. 3D, supplemented by the signal SAP of the bright spot during line flyback (as a result erasing can also take place during the frame return).

Figure 4:
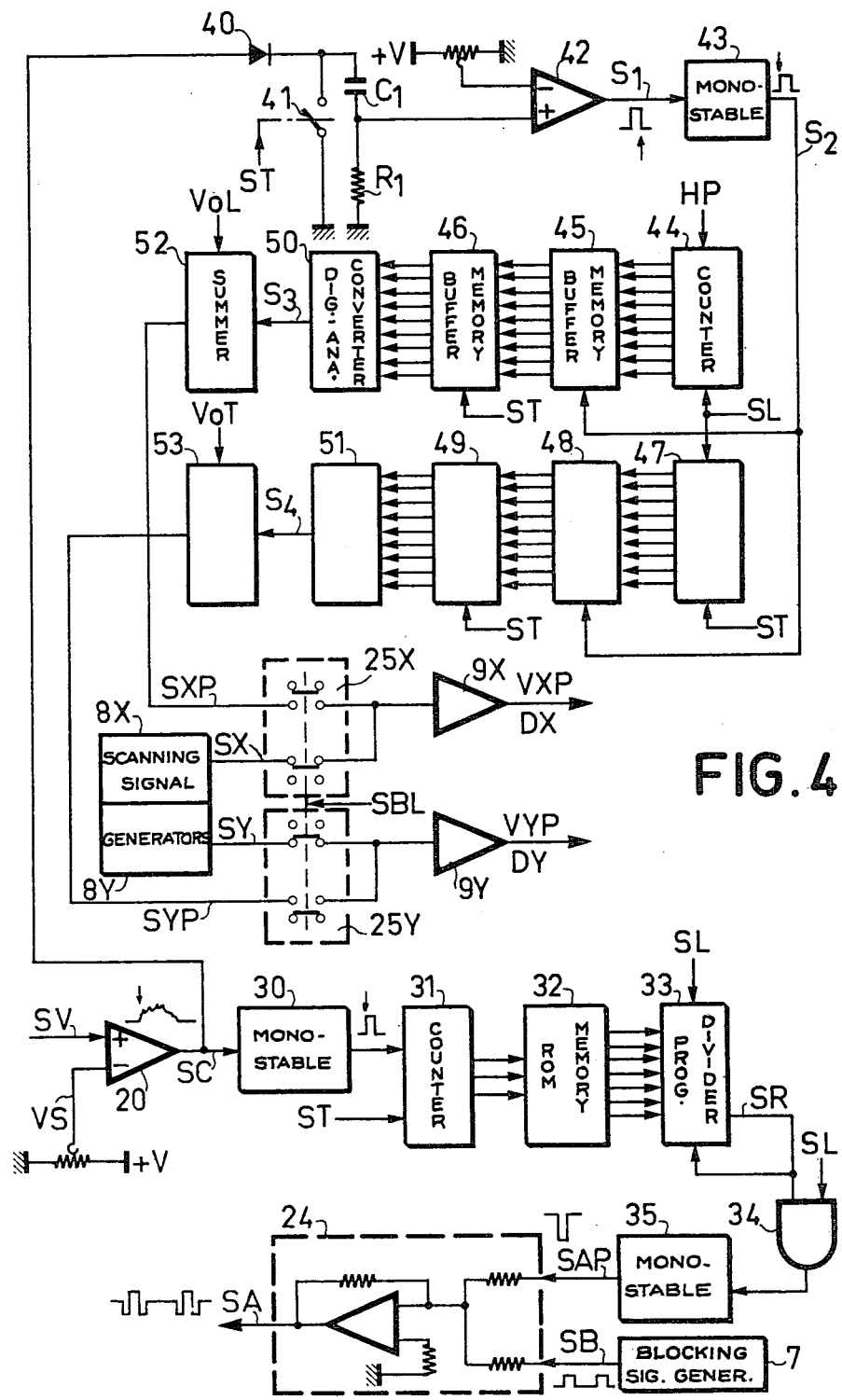
FIG. 4: an embodiment of the anti-blooming device.

The position and lay-out of the means used for forming the anti-blooming device and its operation will become more apparent from the following description of an embodiment according to FIG. 4 and by means of the wave shapes of FIG. 5. The first stage consists of detecting the presence or appearance of a bright spot, i.e. the area TS (FIG. 2) where charge storage reaches saturation level. This is realized by comparator 20, whose comparison threshold VS is adjusted to a predetermined level below the saturation level and preferably relatively close to the latter. The analog output SC of the comparator is applied to the circuit for generating the image of the bright spot constituted by components 30 to 35. To each line traversing the area TS whose level is higher than the comparison level the comparator supplies a signal SC applied to a monostable circuit 30, which produces a corresponding fine pulse for triggering a counter 31 started at the frame frequency 1/TI, the frame synchronizing circuit ST resetting the counter. Thus, at the end of each image scanning, the binary number n1 written into counter 31 corresponds to the extension at Y of the saturated area TS and is therefore a function of the brightness of the bright spot. This number n1 is transferred to the following circuit 32 formed by a read-only memory which makes another higher binary number n2 correspond thereto. This intermediate circuit 32 is useful because as a result of the action of the closed circuit the blooming phonomenon is greatly reduced and may even be completely eliminated. In addition, number n1 becomes very low corresponding to one or two lines. The following circuit 33 constitutes a programmable divider in the form of a counter, whose carry output SR is looped to the load input. It receives the synchronizing signal SL and performs a count at the line frequency, taking account of the value n2 displayed at the input. When the count reaches the value n3 corresponding to the capacity of the counter it supplies the output signal SR (FIG. 5E). The frequency of signal SR is a function of the difference n2−n3 and increases when this difference drops and vice versa, making it possible to vary the frequency of the erasure of the charges of the bright spot on the retina. Signal SR is applied by means of an AND-gate 34 to a monostable circuit 35, for example, in order to form the unblanking pulse SAP (FIG. 5F) having a desired width. Gate 34 permits a possible operation at the line rate. The mixer circuit 24 of signals SAP and SB can be in the form of an operational amplifier arranged in adder form in the manner shown and which supplies the combined signal SA to the tube control electrode.

Along a second channel the output signal SC of comparator 20 supplies circuits for producing signals SXP and SYP corresponding to the scanning of the bright spot. These circuits firstly comprise a peak detector circuit with an input diode 40 supplying a capacitive memory C1 in series with a resistor R1. The memory is reset by a short-circuit 41 controlled at the frame frequency by signal ST. The voltage at the terminals R1 is compared with a threshold in circuit 42 of the digital output comparator type in such a way that the signal is produced in the form of pulses S1, whose trailing edges (FIG. 5B) correspond in time to successive increasing peak values of signal SC (FIG. 5A). The trailing edge of the final pulse S1 is produced on the scanning line passing through the maximum peak level of area TS and at the corresponding time t1. It is therefore possible to determine the coordinates of the bright spot P. Signal S1 formed from pulses of different widths is applied to a monostable circuit 43 triggered by the falling front of successive pulses S1. A counter 44 receives a clock signal HP at the spot frequency and is reset by signal SL at the line rate. It performs a count of the successive points of the line during scanning. The point count is transferred to memory 45 whenever a pulse S2 from monostable circuit 43 is received, i.e. at each falling front of signal S1. A second memory 46 is controlled at the end of the frame by signal ST to store the final information present in memory 45, said information corresponding to the rank of the points coinciding with the final pulse S1, i.e. at the maximum peak detection time T1 translating the distance L/2−XP (FIG. 2). The information T/2−YP is obtained in the same way by circuits 47, 48, 49, counter 47 performing a count of the successive lines of the image scan taking place. The data stored in 46 and 49 are converted into analog form respectively in converting circuits 50 and 51 with an appropriate conversion factor for introducing the multiplication coefficient or useful gain at this level. The output S3 and S4 of the convertors are treated by summation respectively at 52 and 53 before being applied to the power amplifiers 9X of the horizontal channel and 9Y of the vertical channel. Summation has the effect of reducing the deflection values with respect to the reference point 0, the indicated voltages VoL and and VoT corresponding to values L/2 and T/2. Summation takes place with the appropriate signal for producing the desired signals SXP and SYP. The mixing of these signals with the SX and SY signals of the TV scan is produced by switching circuits 25X and 25Y triggered by the line blanking signal SBL. At each blanking period TRL channels SXP, SYP are transmitted to amplifiers 9X, 9Y and vice versa, whilst during the residual lighting period TL-TRL the signals SX and SY are transmitted. The scanning of the bright spot takes place during the line return if the pulse SAP is present in the signal SA applied to the modulator.

The anti-blooming device according to the invention thus makes it possible to relieve the retina at the location of the detected bright spot. The resulting local sensitivity modification makes it possible to prevent the blooming phenomenon. The embodiment of FIG. 4 has been given in a purely illustrative manner and it is obvious that numerous variants can be envisaged without passing beyond the scope of the invention.

What is claimed is:

1. A television camera equipped with an anti-blooming device intended more particularly for homing apparatus, comprising;
    a camera tube for supplying a video signal and having an electrode;
    scanning circuits for providing horizontal and vertical deflection signals of a raster scan for said tube;
    a first signal generator for producing electron-beam blanking signals during the line and frame flyback periods;
    a second signal generator for producing line and frame synchronizing signals;
    an anti-blooming device comprising:
        threshold comparator means for comparing said video signal to a threshold substantially equal to the camera tube saturation level to detect video signal amplitudes corresponding to a bright spot,
        first means connected to the output of said comparator means for generating deflection signals which correspond to the horizontal and vertical coordinates of said bright spot, and
        second means connected to the output of said comparator means for generating a signal unblanking the camera tube during a portion of the flyback period to provide a determined electron-beam intensity, said signal being provided at a repetition rate at least equal to a line period and the number of repeated occurrences thereof being determined by the brightness of the bright spot;
        first mixing means for providing the raster scan deflector signals and, during flyback periods, said bright spot deflection signals; and
        second mixing means for providing to the electrode of said camera tube, electron-beam intensity modulating signals comprising said unblanking signals during flyback periods for producing a local modification of the tube sensitivity.

2. A camera according to claim 1, wherein the second and first mixing means comprise respectively, a mixer circuit for combining the blanking signal and the possible bright spot unblanking signal in the form of a single intensity control signal and branch circuits for supplying deflection means from the scanning circuits outside the line return and from the bright spot deflection generator during line returns.

3. A camera according to claim 2, wherein the branch circuits comprise a first circuit on the horizontal deflection channel, a second circuit on the vertical deflection channel, each of them incorporating two switches in opposition of state controlled by the line blanking signal.

4. A camera according to claim 1 or 2, wherein said first generating means comprise a peak detection circuit of the comparison output for detecting successive increasing peak levels, point and line counter circuits respectively followed by memory circuits for storing localization data of the maximum peak level of the raster image scan taking place, and circuits for the digital-analog conversion of said data.

5. A camera according to claim 4, wherein the peak detection circuit comprises a diode connected to a capacity in series with a resistor, a comparator for comparing to a threshold the voltage at the terminals of the resistor and a monostable circuit at the comparator output, and wherein each counter circuit is followed by a first memory addressed by the output of the monostable circuit, then a second memory addressed by the frame synchronizing signal for reading out the final data stored in the first memory during the raster scan in question.

6. A camera according to claim 4, wherein said second generating means successively comprise a monostable circuit receiving the comparison output, a counter-circuit reset at the frame rate, a read-only memory, a programmable divider circuit programmed by the read-only memory output and carrying out a differential count at the line frequency and a monostable circuit supplying the bright spot electron-beam intensity pulse.

* * * * *